July 20, 1948.  L. D. ST. JOHN  2,445,461
WEEDLESS FISHING PLUG.
Filed June 10, 1946  2 Sheets-Sheet 1
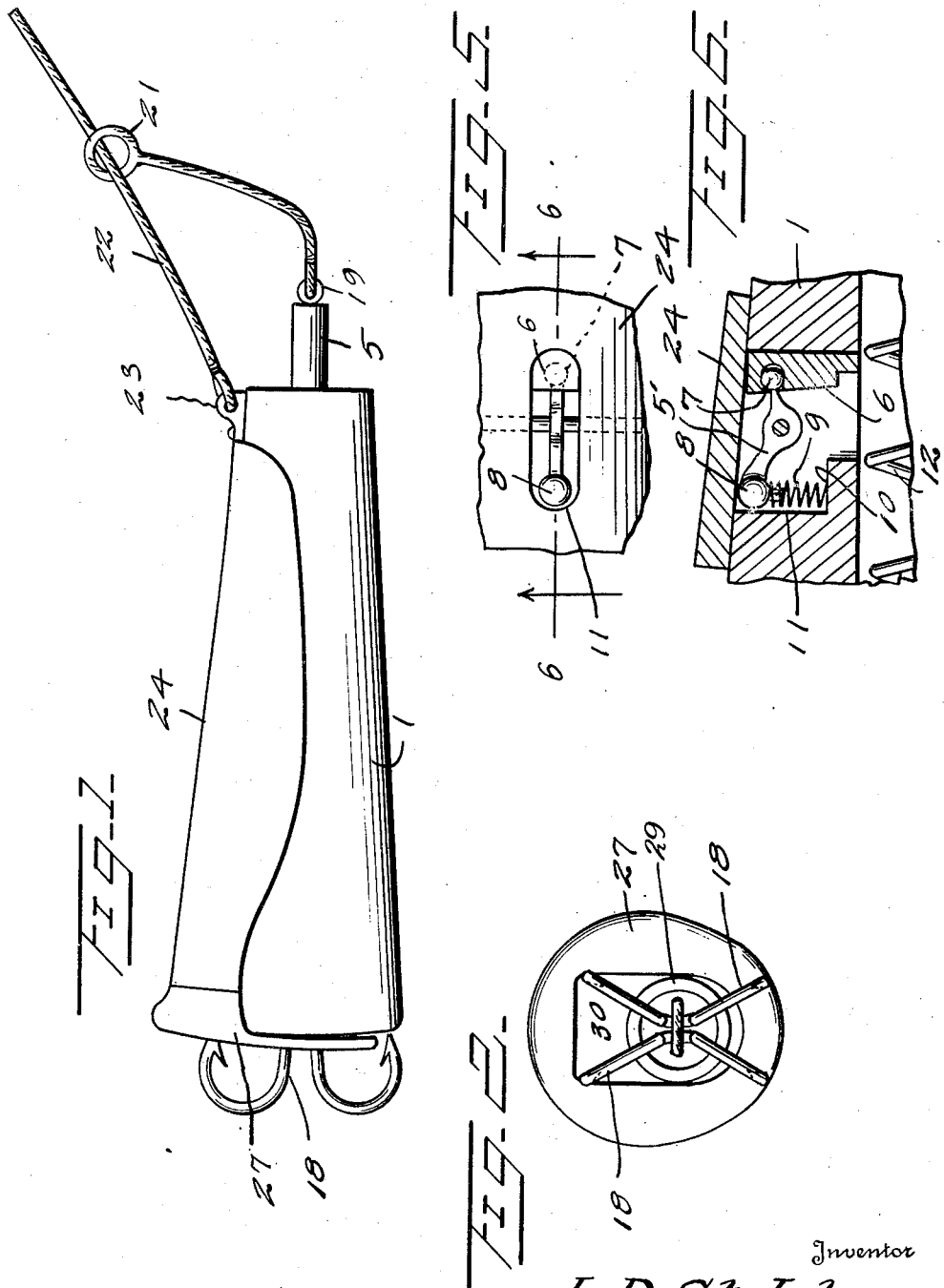
Inventor
L. D. St. John
By John Pattendorffer
Attorney July 20, 1948.  L. D. ST. JOHN  2,445,461
WEEDLESS FISHING PLUG
Filed June 10, 1946  2 Sheets-Sheet 2
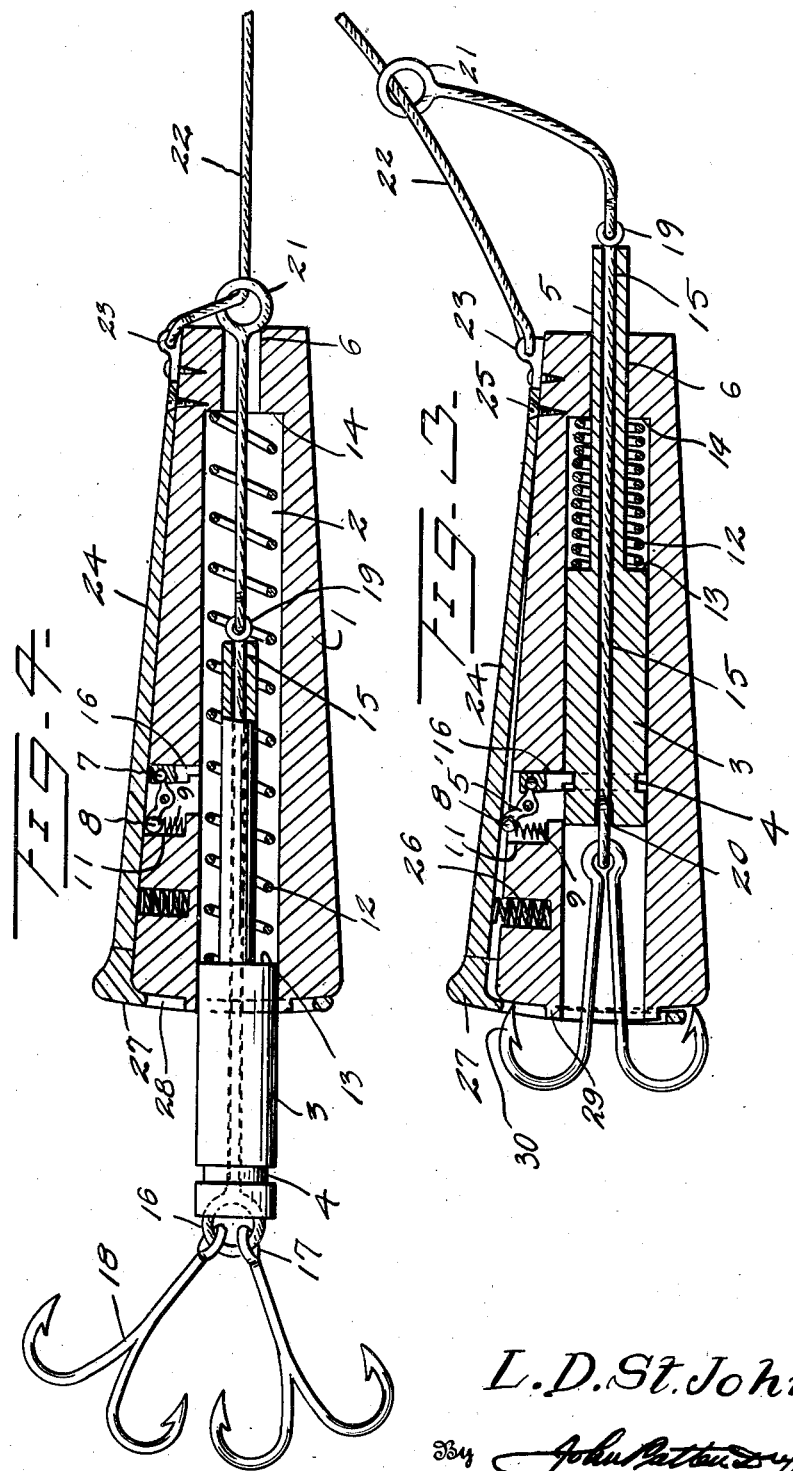
Inventor
L. D. St. John
By John Patten Duggan
Attorney Patented July 20, 1948

2,445,461

UNITED STATES PATENT OFFICE 2,445,461

WEEDLESS FISHING PLUG

Lewis D. St. John, Edgerton, Wis.

Application June 10, 1946, Serial No. 675,595

1 Claim. (Cl. 43—35)

This invention relates to new and useful improvements in weedless fishing plugs.

One object of my invention is to provide a fishing plug in which the barbs of the hooks are protected against the accumulation of weeds or other debris, when the hooks are in retracted position preparatory to casting, and until released by the pressure of the fish or the hand.

A further object of my invention is to provide a novel latch device for locking the spring controlled plunger in retracted position and novel means for actuating the latch device to release the plunger when pressure is applied thereto by the fish or by hand.

A still further object of my invention is to provide novel means for connecting the hooks with the plunger to permit the hooks to flop or strike around at any angle when the plunger is released and forcibly ejected from the plug.

With the foregoing and other objects in view that will appear as the nature of my invention is better understood, the same consists in the novel features of construction, combination and arrangement of parts illustrated in the accompanying drawings and more particularly pointed out in the appended claim.

In the accompanying drawings, which are for illustrative purposes only and are therefore not drawn to scale:

Figure 1 is a side elevation of a weedless fishing plug, constructed in accordance with my invention.

Figure 2 is an end view.

Figure 3 is a vertical longitudinal section, with the hooks and plunger in retracted position.

Figure 4 is a similar view, with the hooks and plunger in projected position.

Figure 5 is an enlarged detail plan view of the latch device for the plunger, and associated parts.

Figure 6 is a vertical transverse section, taken on line 6—6 of Figure 5.

Referring to the drawings for a more particular description of my invention, and in which drawings like parts are designated by like reference characters throughout the several views, my device essentially comprises the cylindrical outwardly tapering plug or casing 1, formed throughout the greater portion of its length with a central longitudinal cylindrical bore 2, in which is slidably mounted the cylindrical plunger 3.

The plunger 3 is formed at its outer end with an annular groove 4, adapted to be engaged by the latch 16 when the plunger is in retracted position, and is formed at its inner end with a reduced hollow cylindrical stem or sleeve 5, which extends through a corresponding opening 6, in the adjacent end of the plug or casing 1.

The inner end of the latch 16 is normally held in the annular groove 4 of the plunger 3 by the pivoted lever 5', one end of which has a ball and socket connection, as at 7, with the latch, and the opposite end 8 of which bears against the outer end of the coil spring 9, whose inner end rests on the shoulder 10, formed at the inner end of the recessed portion 11 of the plug, or casing 1. A coil spring 12 is arranged in the bore 2 of the plug 1, and encircles the stem 5, with one end bearing against the shoulder 13, formed at the junction of the body portion and stem of the plunger, and its opposite end bearing against the wall 14 formed at the inner end of the bore 2.

A cable 15 extends through the body and stem of the plunger 3 and is provided at its outer end with a circular loop 16, to which is connected the eyes 17, formed at the inner ends of the double barbed hooks 18. The cable 15 is also provided intermediate its length, with a relatively small metal ring or disk 19, which works against the outer end of the stem 5 of the plunger. The ring or disk 19 holds the loop 16 at all times in proper position in the recessed outer end or head 20 of the plunger, but permits the double barbed hooks 18 to flop or strike about at all angles when the plunger is released by the latch device and forcibly ejected from the plug by the coil spring 12. The inner end of the cable 15 is also formed with a circular loop 21 adapted to engage the corresponding end of the plug and limit the outward movement of the plunger.

A cable 22 is fastened at one end, as at 23, to the inner end of the plug 1 and passes through the loop 21 of the cable 15 to the swivel of the fishing line.

A housing 24 fits over the plug 1 over the latch device. The inner end of this housing is secured to the plug by the screw 25 or other equivalent means and the outer end thereof is normally held in slightly raised position with respect to the plug, by the coil spring 26, as illustrated in Figure 3 of the drawings.

In practice, when pressure is applied to the housing by the fish, or by hand, the outer end of the housing is depressed against the tension of the coil spring 26 and in so doing depresses the end 8 of the pivoted lever 5' and disengages the latch 16 from the annular groove 4 of the plunger 3. This releases the plunger, which is forcibly ejected through the outer end of the central bore 2 of the plug 1, with the results heretofore explained.

A hood 27 is soldered or otherwise secured to the outer end of the housing 24 and extends over the front of the plug 1. The hood 27 is formed with an elongated guide opening 28, which permits it to move up and down with respect to the annular boss 29, formed at the outer end of the plug.

The form of the outer end of the plug 1 and opening 28 in the hood 27 permits the barbs 30 of the double barbed hooks 18 to fit closely against the plug when the plunger is in retracted position ready for casting, and this will prevent the accumulation of weeds or other debris on the barbs of the hooks until the device is caused to operate.

From the foregoing description taken in connection with the drawings, it is thought that the construction, operation and advantages of my invention, will be readily understood without requiring a more extended explanation.

Various changes in the form, proportions and minor details of construction may be resorted to without departing from the principle or sacrificing any of the advantages of my invention, as defined in the appended claim.

Having described my invention, what I claim as new and desire to secure by Letters Patent, is:

A device of the character specified, comprising a tapering plug formed with a central longitudinal bore, a hollow spring controlled plunger, slidably mounted in the bore of said tapering plug, a cable extending through the plunger and formed at its outer end with a loop, double barbed hooks loosely connected to the loop of said cable, a spring controlled latch device to hold the plunger in retracted position, a housing on the tapering plug over the latch device to release the latter from the plunger when pressure is applied to the housing, a second loop at the inner end of the cable to limit the outward movement of the plunger, a metal ring or disk secured to the cable and fitting against the inner end of the plunger, and a second cable extending through the second loop to the fishing line.

LEWIS D. ST. JOHN.

REFERENCES CITED

The following references are of record in the file of this patent:

UNITED STATES PATENTS

| Number | Name | Date |
|---|---|---|
| 387,015 | Smith | July 31, 1888 |
| 945,091 | Hanel | Jan. 4, 1910 |
| 1,259,390 | Gilbert | Mar. 12, 1918 |
| 1,318,073 | Gottschalk | Oct. 7, 1919 |
| 1,448,735 | Edmondson | Mar. 20, 1923 |
| 1,791,083 | Pike | Feb. 3, 1931 |